United States Patent [19]

Trexler, Jr.

[11] Patent Number: 4,507,706
[45] Date of Patent: Mar. 26, 1985

[54] PLUG-IN INSTRUMENTATION SYSTEM

[75] Inventor: Ray W. Trexler, Jr., King County, Wash.

[73] Assignee: Paccar Inc., Bellevue, Wash.

[21] Appl. No.: 644,136

[22] Filed: Aug. 23, 1984

Related U.S. Application Data

[63] Continuation of Ser. No. 389,872, Jun. 18, 1982, abandoned.

[51] Int. Cl.³ .............................................. H02B 1/04
[52] U.S. Cl. ................................. 361/331; 339/17 D; 362/29; 340/79; 361/346; 361/399
[58] Field of Search ............... 339/17 C, 17 D, 193 P; 248/27.1, 27.3; 116/300, 62.4; 307/10 R, 10 LS; 362/23, 28, 29, 80, 249; 340/815.15, 815.16, 815.2, 79; 296/70; 180/90; 361/331, 346, 356, 358, 364, 365, 380, 395, 399, 400, 404–406, 417, 419, 420, 412, 421, 422

[56] References Cited

U.S. PATENT DOCUMENTS

| | | | |
|---|---|---|---|
| 3,015,718 | 1/1962 | Petri | 174/68.5 |
| 3,022,447 | 2/1962 | Henss | |
| 3,174,576 | 3/1965 | Woofter | 174/72 A |
| 3,193,226 | 7/1965 | Showalter | |
| 3,223,367 | 12/1965 | Iglehart | |
| 3,232,566 | 2/1966 | Eisenberg | |
| 3,471,029 | 10/1969 | Dolan | |
| 3,504,876 | 4/1970 | Swanson | |
| 3,589,656 | 6/1971 | Protzmann | |
| 3,744,748 | 7/1973 | Harrold | |
| 3,964,705 | 6/1976 | Giovanni | |
| 4,040,709 | 8/1977 | Dola | |
| 4,177,497 | 12/1979 | McCook | 362/29 |
| 4,209,154 | 6/1980 | Hehl | |
| 4,227,238 | 10/1980 | Saito | |

Primary Examiner—G. P. Tolin
Attorney, Agent, or Firm—Seed and Berry

[57] ABSTRACT

An instrumentation system for vehicles is provided which permits electrical, pressure and vacuum gauges to be interchangeably snap-in mounted into uniform gauge locations in a pivoting housing. Electrical gauges are automatically tied in to the vehicle electrical system as they are snapped in. A plurality of individual lamps on a common circuit provide illumination for each gauge. The lamps are detachably mounted on the housing and may be removed and replaced without disconnecting the gauges or other lamps.

4 Claims, 3 Drawing Figures

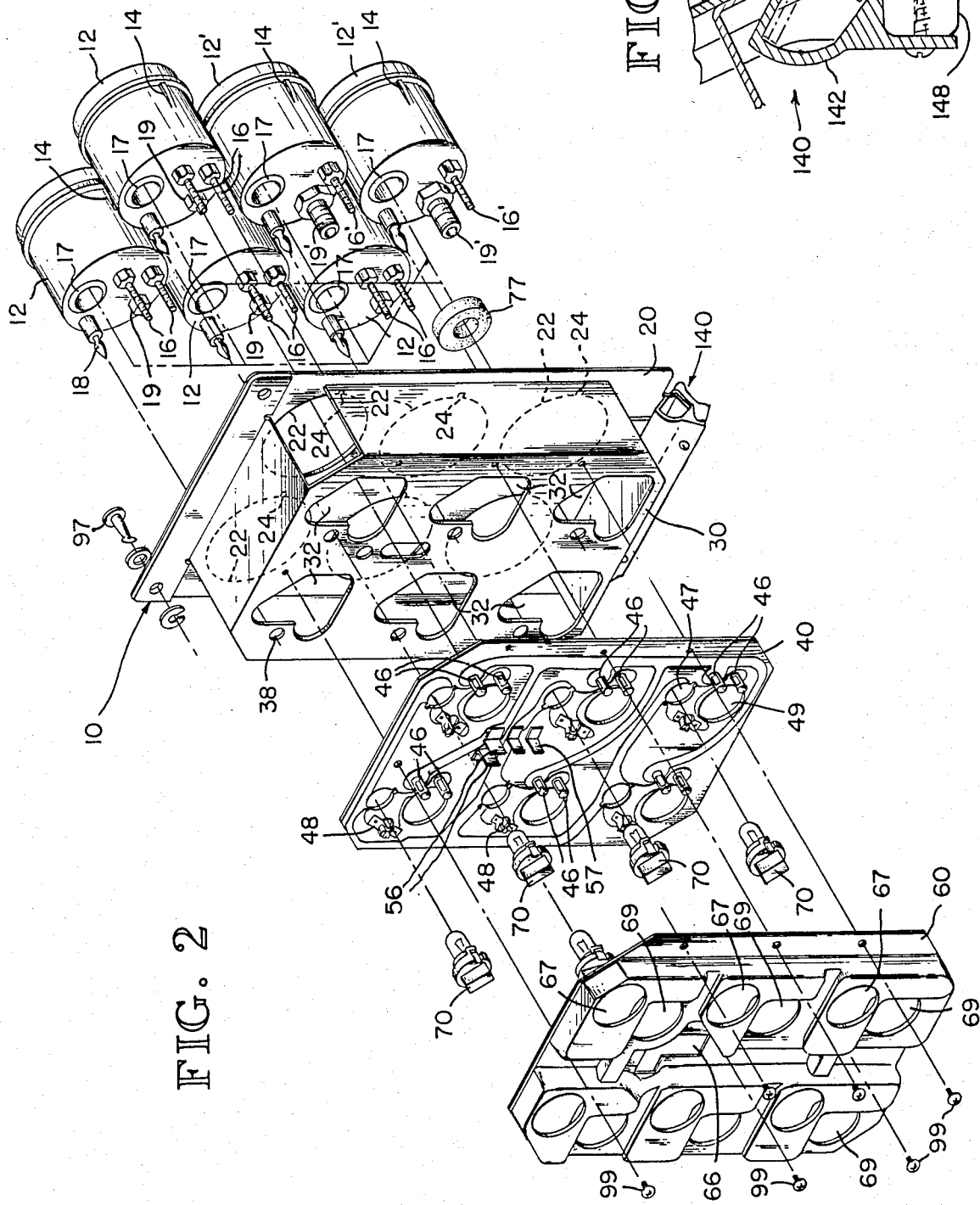

PLUG-IN INSTRUMENTATION SYSTEM

This application is a continuation of U.S. patent application Ser. No. 389,872, filed June 18, 1982, now abandoned.

DESCRIPTION

1. Technical Field

This invention relates to vehicle instrumentation systems, and more particularly, to a system which permits instruments or gauges to be readily and interchangeably installed and serviced.

2. Background Art

Manufacturers of motorized vehicles, particularly truck manufacturers, offer a relatively large number of optional instruments for sale to their customers in addition to standard instruments, such as speedometers and odometers, which are sold with every vehicle. These optional instruments monitor a wide variety of system conditions and functions. For example, electrical gauges and mechanical gauges (such as vacuum and pressure gauges) can be used to monitor the temperature and pressure of the various fluid systems within the vehicle. Additionally, electrical gauges can be used to monitor various conditions within the electrical system of the vehicle. Based on individual interests and needs, a customer will normally select several of these instruments when purchasing a motorized vehicle, such as a truck cab.

Each electrical gauge normally requires that three connections be made before it is operable. Two electrical connections are required to provide power to the gauge. A ground wire and a lead wire normally connect the gauge to the vehicle's electrical system. The third required connection is the signal or transducer connection. In the case of an electrical gauge, the signal connection is made by connecting a wire carrying an input signal to a terminal on the gauge.

Each vacuum or pressure gauge normally requires only a signal connection to be operable. A hose, coupled to the appropriate part of the vehicle for determining pressure, is secured to the rear of the gauge to provide the necessary signal connection.

Existing instrumentation systems for motorized vehicle gauges rely, for the most part, on mounting each gauge at a predesignated location on the vehicle dashboard and thereafter making the connections necessary for each gauge. As gauges are preferably mounted as close to one another as possible to facilitate easy reading of the guages by the vehicle operator, a "bird's nest" of wires and hoses inevitably develops behind the dashboard, making installation and maintenance difficult.

One effort to minimize this "brid's nest" of wiring is shown in the patent to Henss, U.S. Pat. No. 3,022,447. The Henss patent discloses an instrumentation system in which measuring instruments are mounted to a dashboard in conventional fashion. A backplate engages the rear of the instruments to provide all necessary electrical connections as well as bulbs which project into the rear of the instruments to provide illumination. Although the system disclosed in Henss reduces the "bird's nest" of wires which would otherwise accumulate behind the instruments, several difficulties remain with such a system. Each instrument or gauge in the Henss system is dedicated to a particular location. For this reason, the Henss system is not well suited to permit a customer to select from a large variety of gauges.

Another drawback of the Henss system is that it is not well suited to accommodate vacuum and pressure gauges interchangeably with electrical gauges. Additionally, removal of a gauge for maintenance or replacement requires that the backplate be removed and the instrument disconnected. Similarly, replacement of light bulbs in the Henss system also requires that the entire backplate be removed. As the backplate is mounted behind the dashboard, removal of the backplate and alignment of the backplate for reinstallation can be inconvenient and time-consuming.

DISCLOSURE OF INVENTION

It is an object of this invention to provide an instrumentation system which permits gauges installed therein to be interchangeably mounted.

It is another object of this invention to provide an instrumentation system which permits gauges mounted therein to be readily replaced with either the same or a different type of gauge.

It is another object of this invention to provide an instrumentation system that will permit either electrical gauges or mechanical gauges, such as vacuum or pressure gauges, to be mounted in a given location.

It is another object of this invention to provide an instrumentation system that will minimize assembly and installation time by reducing the number of connections to be made when assembling or installing the system.

It is another object of this invention to provide an instrumentation system having individual bulbs for illuminating the individual instruments wherein the bulbs may be readily replaced without removing or disconnecting the gauge.

It is another object of this invention to provide such an instrumentation system wherein all such illuminating bulbs may be dimmed simultaneously.

These and other objects of the invention, which will be apparent to those skilled in the art as the invention is more fully described below, are obtained by providing an instrumentation housing which is preferably pivotally mounted in the vehicle dashborad such that the entire housing can swing outwardly away from the dashboard. The housing includes a front instrument panel and a rear circuit board plate with a predetermined number of standardized (equal size and shape) holes placed at corresponding locations in the panel and plate. Gauges shaped to conform to the standardized holes may be interchangeably mounted in the system from the front of the instrumentation panel. When the gauges are inserted into the housing, a mounting pin positioned on the back of each gauge snaps into a corresponding bracket member mounted on a circuit board on the back side of the circuit board plate. At the same time, the ground and lead terminals of each electrical gauge are fitted within corresponding female terminals on the circuit board. The circuit board ties the ground and lead terminals of each electrical gauge to a common location, thus requiring only a single ground and lead connection between the vehicle power source and the instrumentation system.

The circuit board also includes means for mounting bulbs on the rear of the circuit board such that the bulbs project through apertures in the circuit board plate to the front side of the circuit board plate. The back side of each gauge preferably includes an aperture positioned corresponding to each bulb location to permit the bulb to extend within the gauge to provide illumination of the gauge. The circuit board also provides ground and lead connections to each bulb location so that all bulbs are on a common circuit, which may include a dimming unit.

BRIEF DESCRIPTION OF THE DRAWINGS

FIG. 2 is an exploded isometric view illustrating the relationship of the components of the instrumentation system.

FIG. 2A is a side elevational view of the pivotal mounting.

BEST MODE FOR CARRYING OUT THE INVENTION

Figure 1:
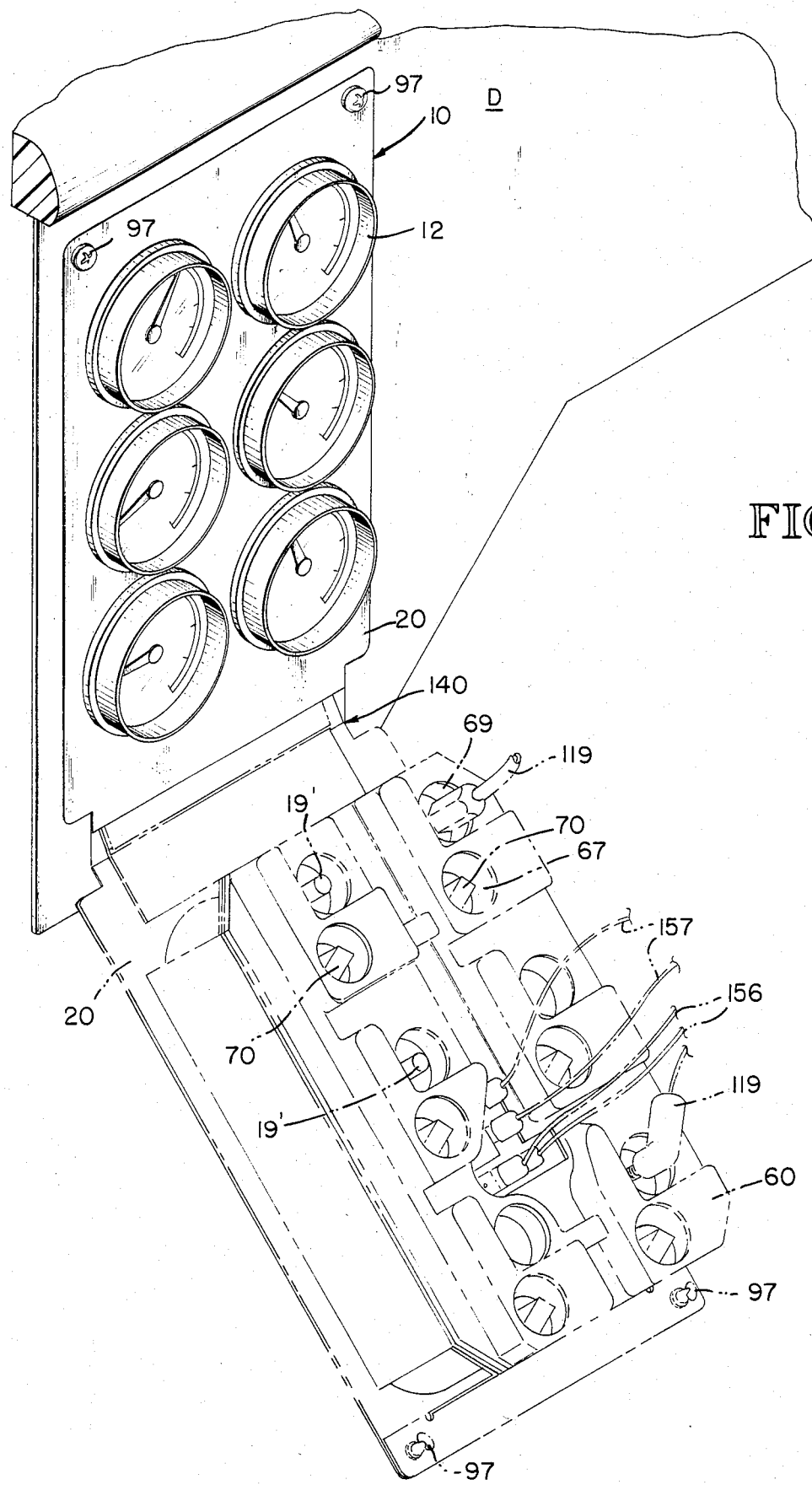
FIG. 1 is an isometric view of the instrumentation system of this invention showing the front side of the instrumention system secured to a vehicle dash in solid line and the rear of the system when it is pivoted outwardly for access in phantom lines.

FIG. 2 illustrates a preferred embodiment of the plug-in instrumentation system of this invention. A housing 10 includes a front instrument panel 20 having a plurality of apertures 22 of uniform size and shape for receiving either electrical gauges 12 or mechanical gauges 12', each of which has exterior dimensions shaped to conform to the instrumentation plate apertures.

A circuit board plate 30 is positioned behind the front instrument panel 20 a distance corresponding to the depth of the gauges 12,12'. Mounted on the rear face of the circuit board plate 30 is circuit board 40.

Projecting from the rear of each electrical gauge 12 are lead and ground terminals 16 and a mounting pin 18. Mechanical gauges 12' may also include a dummy terminal 16' to enhance securing and alignment of the gauge 12' within the housing 10. Additionally, gauges 12,12' include signal terminals 19,19' which project outwardly from the rear of each gauge. On mechanical gauges 12', the signal terminal 19' comprises a hose mounting which receives either a pressure or vacuum hose (not shown) communicating with another part of the vehicle. When electrical gauges 12 are inserted through apertures 22 from the front side of the front instrument panel 20, the lead and ground connectors 16 and signal terminals 19 of each gauge preferably project through aperture 32 positioned in the circuit board plate. Similarly, when mechanical gauges are so inserted, dummy terminals 19' preferably project through aperture 32. A separate aperture 38 is provided for mounting pins 18. As illustrated in FIG. 2, the front instrument plate apertures 22 are preferably shaped to include slots 24, which receive aligning ribs 14 positioned on gauges 12,12' to ensure that the gauges 12, 12' are properly aligned relative to apertures 32 as well as apertures, terminals and brackets on the circuit board 40, as discussed below.

When gauges 12,12' are mounted within the housing 10, ground and lead terminals 16 and dummy terminals 16' extend through apertures 32 and through correspondingly placed apertures in the circuit board 40 into female terminals 46, as required by the gauge type. The female terminals 46 for each gauge location are electrically coupled to gauge plugs 56 by the circuit board 40. The gauges 12,12' are held in place by mounting pin 18 which extends through aperture 38 in circuit board plate 30 and is held in place by aperture and bracket combination 48 of the circuit board 40.

Signal terminals 19,19' of each gauge 12,12' extend through aperture 32 and a corresponding aperture 49 in the circuit board 40, preferably to the back side of the housing 10 to permit signal wires (not shown) or pressure or vacuum hoses (not shown) from the monitored systems to be connected to the gauges 12,12'.

Lamp assemblies 70 are detachably mounted to the circuit board 40 at lamp apertures 47. The circuit board 40 contains a lamp circuit 70a which provides lead and ground connections to all lamp assemblies 70 via conventional tabs 71. The lamp circuit is electrically coupled to the electrical system of the vehicle via lamp plugs 57. Means for dimming the lamp assemblies (not shown) may be provided to permit the vehicle operator to regulate the intensity of illumination. The bulb portion of the lamp assembly 70 extends through lamp aperture 47 and aperture 32 into opening 17 of each gauge 12,12' for illumination. A washer 77, preferably of foam construction, is secured to the front of the circuit board 40 and circuit board plate 30 surrounding lamp aperture 47, forming a closed tunnel between the rear of the circuit board 40 and the lamp opening 17 through which the bulb portion of the lamp assembly 70 extends.

When a metal circuit board plate 30 is used, the circuit board 40 may be simplified by grounding the circuit board plate 30. The ground connection from either the gauge plugs 56 or the lamp plugs 57 can be electrically coupled to the circuit board plate 30. The ground connection for the individual lamp assemblies 70 or gauges 12,12' can then be completed via a common ground circuit at each gauge location, the ground circuit being electrically coupled to the grounded circuit board plate 30. This coupling is preferably accomplished by connecting the ground circuit of each gauge location to the bracket of the bracket and aperture combination 48, which is preferably riveted to the circuit board 40 and circuit board plate 30. When this connection is made, the apertures 32 in the circuit board plate, through which the lead terminals pass, should be of sufficient size to insure that no contact is made between the lead terminal and the grounded circuit board plate 30.

The housing assembly 10 preferably additionally includes cover plate 60, formed of insulating material, which isolates the circuit board from direct contact with other parts of the vehicle. Included within the cover plate 60 are apertures 69, corresponding in location to apertures 49, to permit signal connections to be made, and apertures 67, corresponding in location to lamp apertures 47, which permit lamp assemblies 70 to be installed and removed from the circuit board 40 without removing the protective plate 60 and T-opening 66, which permits access to gauge plugs 56 and lamp plugs 57. The protective plate 60 and circuit board 40 are secured to the circuit board plate 30 by fasteners 99.

As seen in FIG. 1, the entire assembly illustrated in FIG. 2 is preferably pivotally mounted within a vehicle dashboard D. The pivotal mounting 140 at the bottom of the housing 10 permit access to the various elements which project through the rear of the circuit board 40. When the instrumentation system housing 10 is pivoted outwardly, as shown in phantom in FIG. 1, lamp assemblies 70 may be readily installed and replaced, signal wires 119 and vacuum or pressure hoses (not shown) may be readily attached to signal terminals 19,19', and lead and ground wires 157,156 may be attached to gauge plugs 56 and lamp plugs 57. A pivotable housing 10 also facilitates removal of the gauges 12,12' by permitting access to the rear of the gauges 12,12' when the housing is pivoted outwardly so that pressure may be applied thereto in order to remove the securing pin 18 from the aperture and bracket combination 48. Fasteners 97 secure the upper portion of the instrument plate 20 to the dashboard D of the vehicle to hold the instrumentation housing 10 in an upright position for use.

As seen in FIG. 2A, the pivotal mounting 140 is preferably comprised of a receptacle 142 shaped to receive a bottom end 144 of the front instrument panel 20. The bottom end 144 is preferably shaped to permit direct insertion of the housing 10 into the receptacle 142. Once in the receptacle 142, the housing may pivot as shown in phantom lines in FIG. 2A. A foam insert 148 may be positioned between the bottom of the receptacle 142 and the dashboard.

Although the invention has been described here in reference to a particular embodiment, as illustrated in FIGS. 1 and 2, the invention is not limited to this embodiment. Many possible modifications and equivalents will be apparent to those skilled in the art, and the scope of the invention is, therefore, not limited to the preferred embodiment described above.

What is claimed is:

1. An instrumentation system for interchangeably mounting electrical, pressure and vacuum gauges in a vehicle, which comprises:

a plurality of gauges of uniform size and shape, each gauge having a signal terminal projecting rearwardly from the the gauge, the gauges including electrical gauges, each electrical gauge additionally including a ground terminal and a lead terminal projecting rearwardly from locations common to each gauge;

a housing having an instrument panel on the front side thereof and a circuit board on the back side thereof, the panel including a plurality of guage apertures of uniform size and shape corresponding to the uniform size and shape of the gauges and interchangeably receiving individual gauges from the front side of the instrument panel, the circuit board including a plurality of identically positioned terminal connectors adjacent each instrument aperture and positioned correspondingly to the location of the ground terminal and lead terminal of each of the electrical gauges, the circuit board including a plurality of signal terminal apertures open to the rear of the housing, the signal terminal apertures adapted to receive signal connectors remote from the housing through the rear of the housing for connecting signal inputs to the signal terminals of the gauges even though the gauges may be interchangeably located at different locations in the housing;

means for releasably securing the gauges within the housing; and said circuit board having circuits for electrically coupling common ground terminals and common lead terminals of each electrical gauge mounted within the housing irrespective of the location of a particular guage in one of the guage apertures in the panel.

2. The instrumentation system for claim 1 wherein the system is adapted for use on a vehicle having a dashboard and the instrumentation system further includes means adapted for pivotally connecting the housing to the dashboard.

3. The instrumentation system of claim 1, further including a plurality of lamps detachably mounted to the housing at locations adjacent each gauge's location such tht the lamps project into the gauges for illumination of the gauges.

4. The instrumentation system of claim 1 wherein the housing further comprises a lamp circuit for automatically providing power to each lamp as it is mounted to the housing.

* * * * *